May 15, 1956 J. BALTON 2,745,363
MACHINE FOR AUTOMATICALLY MAKING ROLLED CONES
Filed Dec. 12, 1951 6 Sheets-Sheet 1

INVENTOR
James Balton.
Albert J. Kramer
ATTORNEY

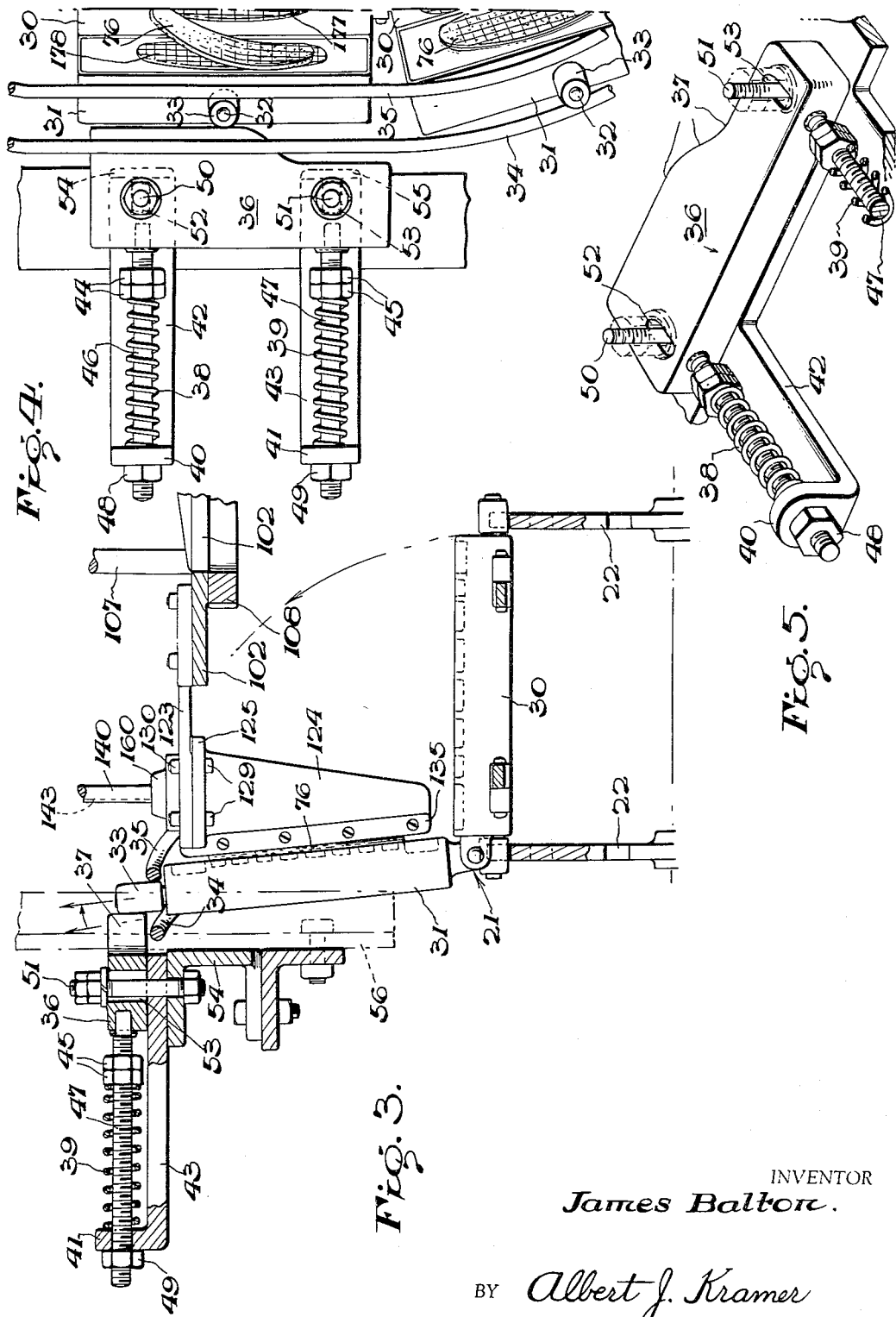

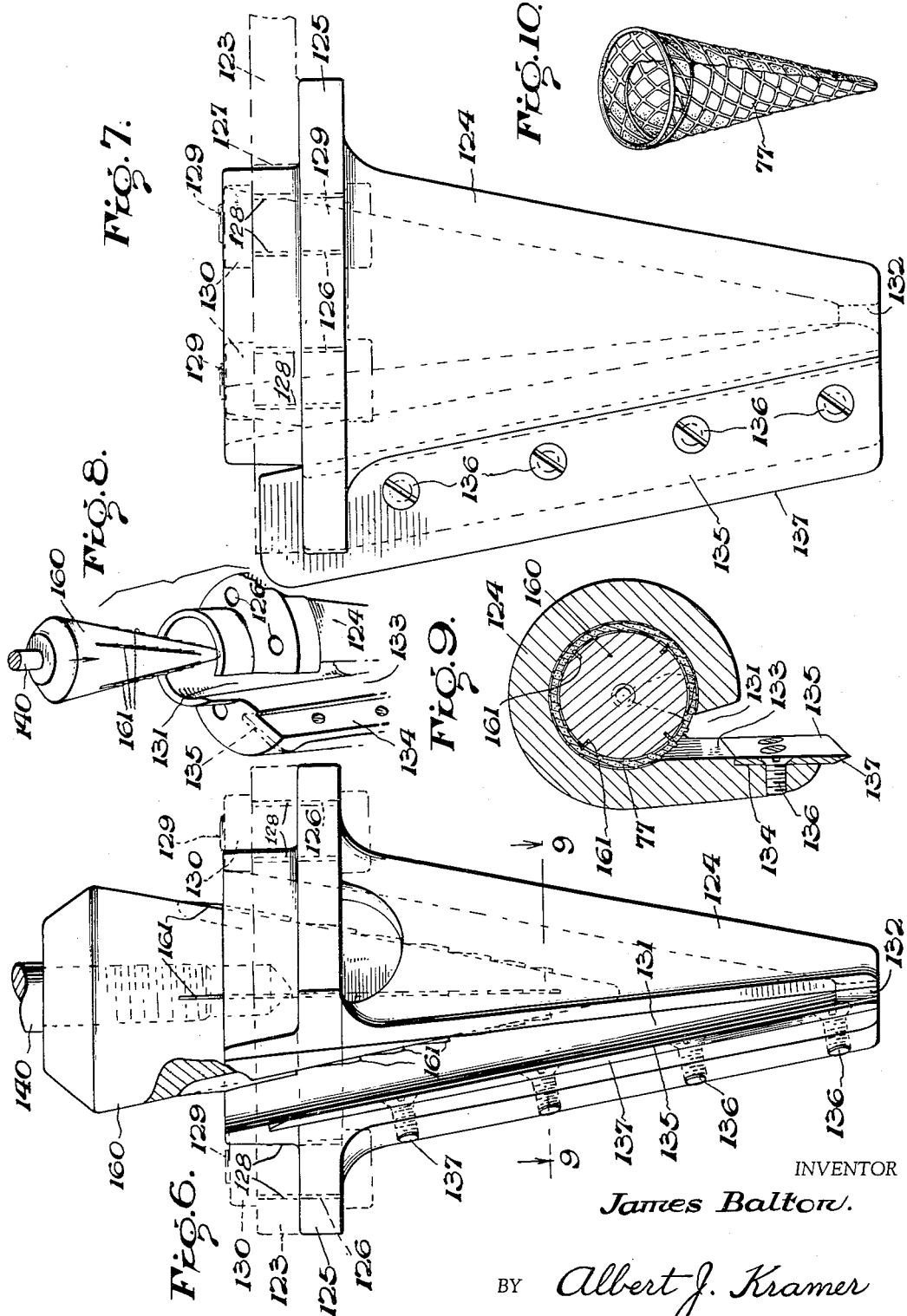

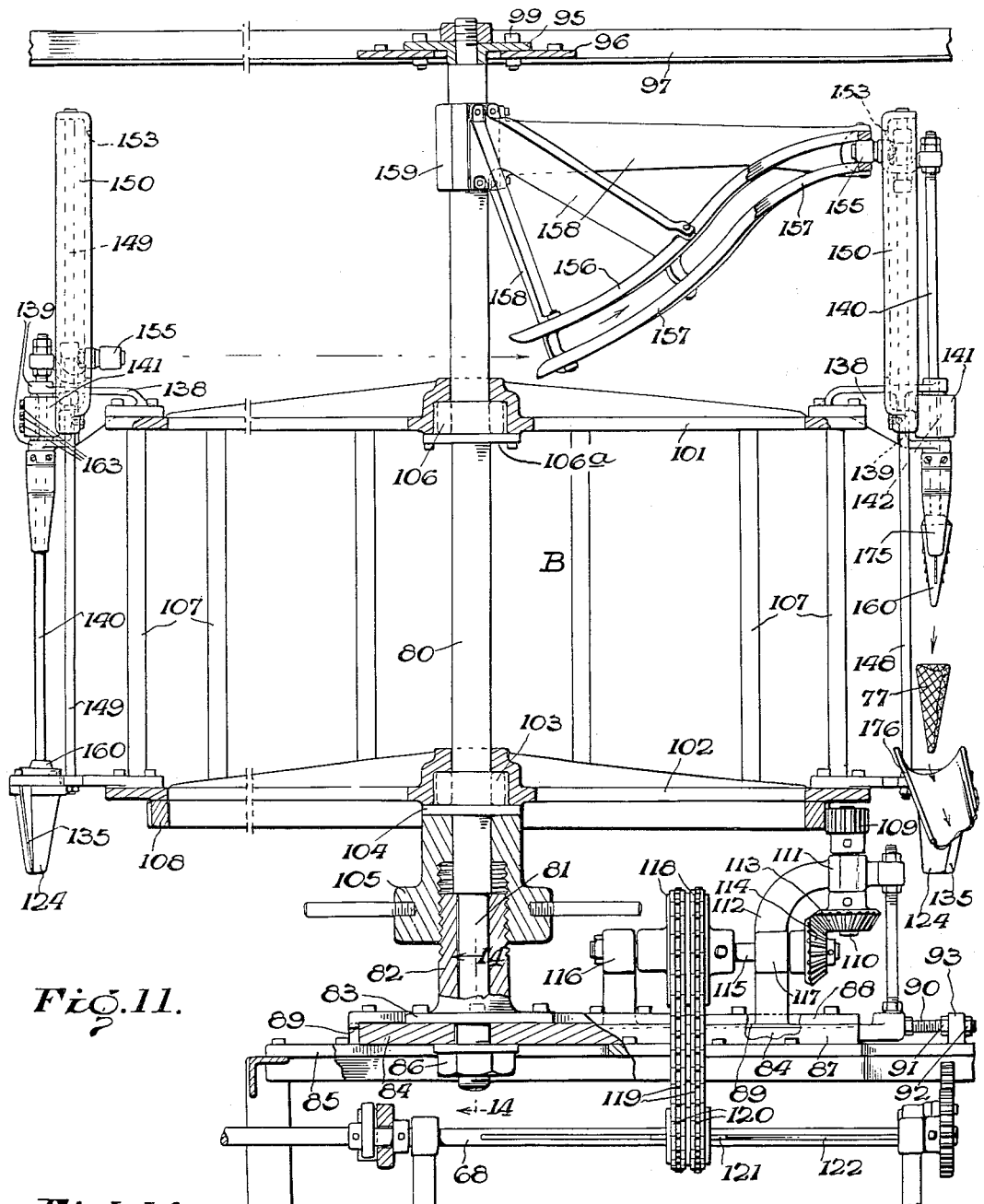

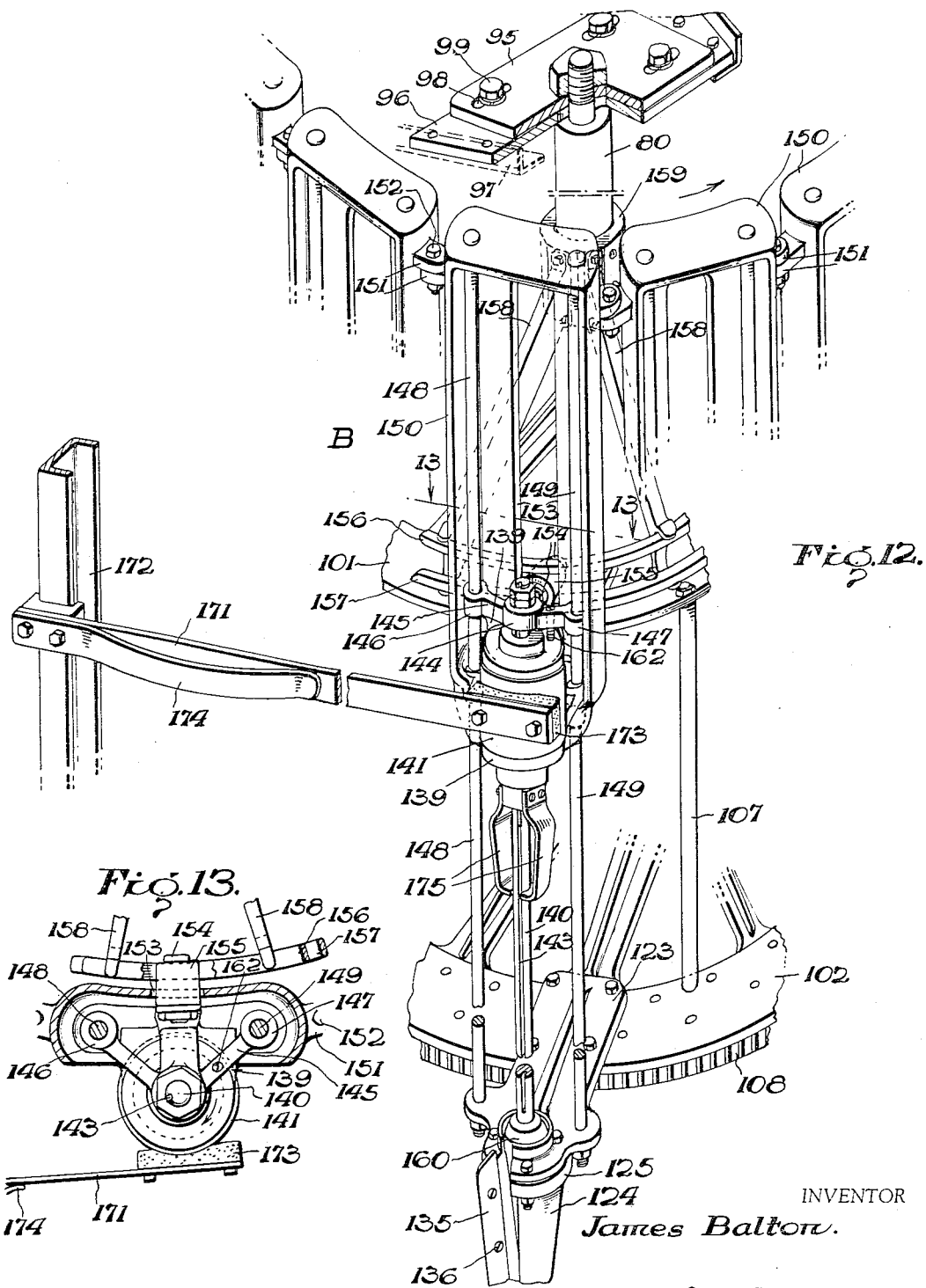

United States Patent Office 2,745,363
Patented May 15, 1956

2,745,363

MACHINE FOR AUTOMATICALLY MAKING ROLLED CONES

James Balton, Baltimore, Md., assignor to The Maryland Baking Company, Baltimore, Md., a corporation of Maryland Application December 12, 1951, Serial No. 261,274

4 Claims. (Cl. 107—58)

This invention relates to cone making machines and is more particularly concerned with machines for manufacturing cones, commonly referred to as rolled or sugar cones and used as edible containers or receptacles for various confections, such as ice cream, frozen custard, sherbets, etc.

The so-called rolled or sugar cone is a well known type of edible confectionery container in the form of a conically rolled sheet. It is customarily formed by baking batter having a high sugar content in the form of a flat wafer and then rolling it into a conical shape while hot and pliable, thereafter permitting it to cool and harden.

Previous methods for manufacturing cones of this type required one machine for baking the flat wafer and a separate machine for shaping the wafers into the desired conical shape. These methods required an operator to personally remove the hot wafers from the baking machine and feed them, one at a time, into the shaping or forming machine. In addition to the discomfort of heat and the dangers to which the operator is subjected, both by the baking machine and the forming machine, the manufacturing capacity is obviously limited by the human ability to manually pick off hot wafers from the baking machine and place them in the shaping machine. Moreover, the human element also frequently results in non-uniformity of the final products and other deficiencies.

The principal object of the present invention is the provision of a completely automatic machine for manufacturing cones of the type mentioned and which eliminates entirely the need for any human operator.

Another object of the invention is the provision of a cone making machine of the type mentioned, including a baking unit and a cone forming unit, so designed that the baked wafers are automatically transferred from the baking unit to the forming unit.

A further object is the provision of a cone making machine of the type mentioned comprising a chain of members for baking the wafers, a unit for rolling the baked wafers into cones, the unit having a slotted inlet for the wafers with a scraper adjacent the inlet for contacting the wafers as they pass a given point and directing them into the inlet.

These and other objects and advantages of the invention will appear more fully from the following description, considered together with the accompanying drawings illustrating an embodiment of the invention.

In the drawings:

Fig. 3 is an elevational view, showing the position of one of the conical mold forms relative to one of the waffle irons at the moment of engagement thereof for the transfer of a hot wafer to the interior of the mold form and showing also the coordinating yieldable cam abutment means in section.

Fig. 4 is a plan view of the yieldable cam abutment.

Fig. 5 is a perspective view of the yieldable cam abutment.

Fig. 6 is a front elevational view of the conical mold form and the cooperating conical spinner or core.

Fig. 7 is a side elevational view of the conical mold form.

Fig. 8 is a perspective view, partly broken away, of the core and mold form.

Fig. 9 is a section along the line 9—9 of Fig. 6, showing the position of a formed cone in the mold.

Fig. 10 is a perspective view showing the type of cone formed by the embodiment.

Fig. 11 is a skeletal view, partly in section, of the turret section of the embodiment, illustrating the principal moving parts thereof and the driving means.

Fig. 12 is a perspective view of a fragmentary portion of the turret section showing the details of one of the core mounting means and related structure.

Fig. 13 is a horizontal sectional view along the line 13—13 of Fig. 12.

Fig. 14 is a sectional view taken on the line 14—14 of Fig. 11.

Figure 1:
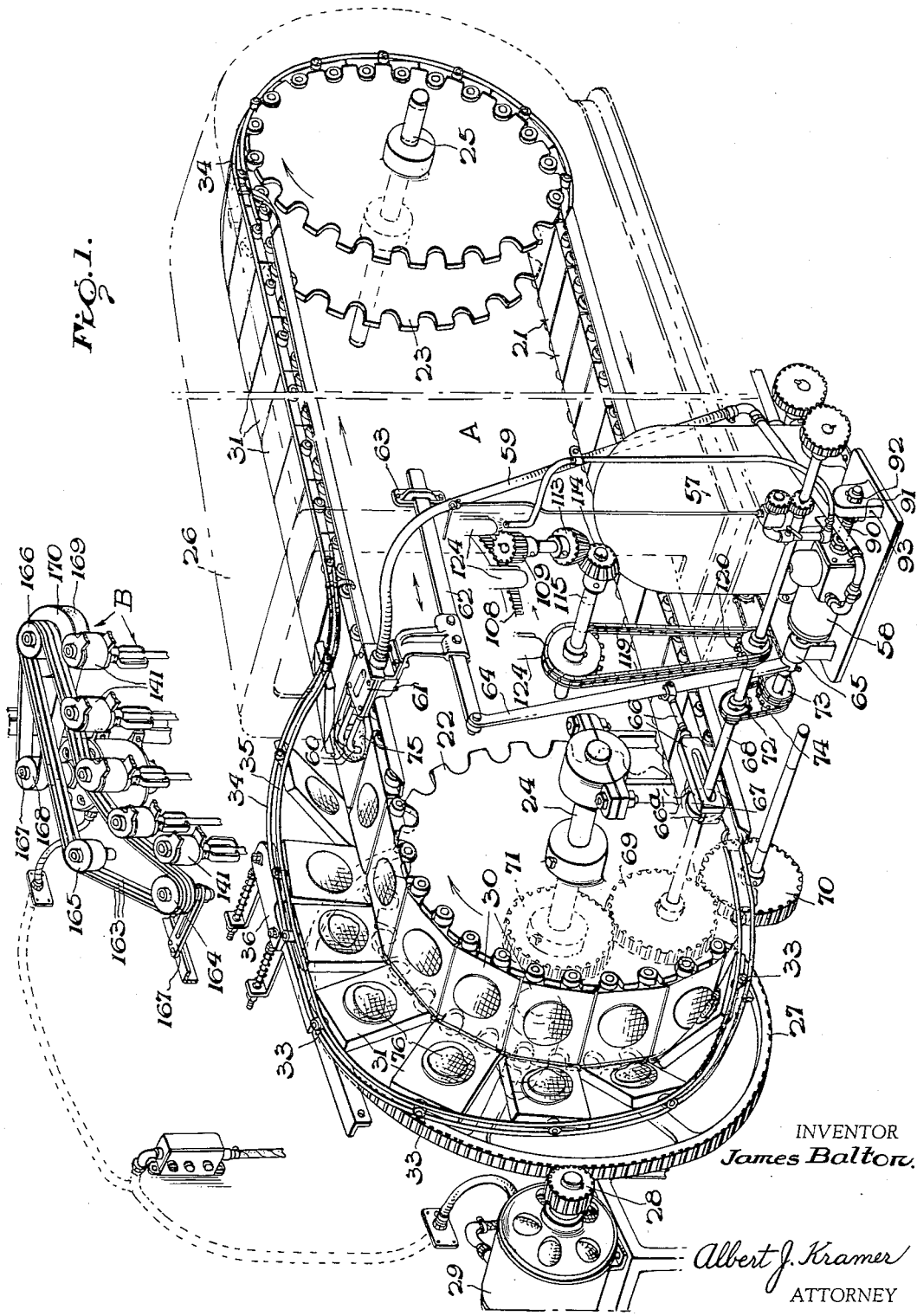
Fig. 1 is a perspective view of the embodiment of the invention, with parts broken away, showing the general arrangement and relative positions of some of the principal elements thereof.

Referring with more particularity to the drawings in which like reference characters designate like parts throughout the various views, the embodiment illustrated comprises generally, two coordinated units, one being the baking unit, designated generally by the letter A, and the other being the cone forming unit, designated generally by the letter B.

The baking unit A comprises an endless chain of waffle irons 21, linked together. The chain is carried by two vertical star wheels 22 and 23 mounted on shafts 24 and 25, respectively. The rear star wheel 23 and a major portion of the upper and lower reaches of the chain of waffle irons, are disposed within the housing 26 of an elongated, horizontal oven. The front star wheel 22 and the remaining portion of the upper and lower reaches of the chain are on the exterior of the oven housing. The interior of the oven housing contains heating elements (not shown) for baking wafers in the waffle irons as they travel therethrough.

The chain of waffle irons is driven by means of a spur gear 27 secured to the shaft 24 which meshes with a pinion 28 on the drive shaft of a motor, such as the electric motor 29.

The waffle irons 21 each comprise an inner or base plate or grill 30 and an outer or cover plate or grill 31 hinged to one side of the base grill. The other side of the cover grill has a projecting stub shaft 32 which carries a cam roller for use in hingedly moving the cover grill to the open and closed positions. This is effected by means of a guideway formed by a pair of parallel tracks 34 and 35 between which the cam rollers slide. The guideway is shaped so that as the waffle irons leave the oven at the bottom, they are gradually opened as they travel around the star wheel 23, being in a fully opened position at the top of the wheel. The rollers 33 then enter into engagement with a yieldable abutment 36 which substitutes for the outer track 34 at this point, the latter being set outwardly at this point to prevent interference with the action of the yieldable abutment against the rollers. At this point also, the baked wafer, which is carried by the cover grill, is removed by the cone forming unit, hereinafter more fully described. The yieldable abutment 36 has an inner edge cam surface 37 for contacting the cover grill rollers 33 and bringing them in proper position relative to the cone forming unit.

The yieldable action of the cam abutment is provided by a pair of compressed coil springs 38 and 39 disposed between the flanged outer ends 40 and 41 of horizontal arms 42 and 43 and adjusting nuts 44 and 45 on bolts 46 and 47. The bolts pass through their respective coil springs 38 and 39 and flanged ends 40 and 41. The inner ends of the bolts engage the back of the abutment cam 36 and the outer ends of said bolts are provided with tensioning nuts 48 and 49 against the outer side of the flanges 40 and 41. The abutment cam is slidably disposed on the horizontal arms 42 and 43 and is held in this position by means of vertical bolts 50 and 51. The bolts 50 and 51 pass through longitudinal slots 52 and 53 of the abutment cam and through apertures in the arm and in the brackets 54 and 55 of the frame 56 to which the arms are secured.

The batter to be baked is free flowing and it is fed from a reservoir 57 by a pump 58 to a delivery pipe 59 which is connected to a group of discharge nozzles or nipples 60. These nozzles are carried on a bracket 61 attached to a horizontal reciprocating arm 62 mounted parallel to the upper reach of the chain of waffle irons. One end of the arm 62 is slidably carried in a stationary sleeve 63, the other end being pivotally connected to a vertical link 64. The other end of the link 64 is pivoted to a stationary member 65, such as the frame of the pump 58 or any other suitable point. Reciprocation is effected by means of an adjustable arm 66 having a cam follower 66A engaging a heart-shaped cam 67 on a powered shaft 68. The shaft is driven through a train of gears 69, 70 and 71, gear 71 being mounted on shaft 24 and thereby connected to the spur gear 27. The shaft 68 also transmits the power to drive the pump 58 through sprockets 72 and 73 and sprocket chain 74.

The flow of batter and the position of the nozzles relative to the waffle irons are so adjusted that the proper amount of batter is deposited on each waffle iron in a pattern 75 which, when baked, will result in a wafer 76 that can be rolled into a cone 77 of the type shown in Fig. 10.

Horizontal reciprocation of the nozzles 60 is for the purpose of controlling the shape of the deposited batter and hence the shape of the final baked wafer. By adjusting the position of the cam 67, the movement of the nozzles 60 during the discharge of batter therefrom may be varied relative to the movement of the waffle irons. This adjustment, plus adjustment of the flow of the batter and the positioning of the nozzles relative to each other and to the waffle irons, permits the deposition of the proper amount and shape of batter.

The cone forming unit, which is designated generally by the letter B, comprises a rotating turret assembly mounted on a vertical stationary shaft 80. The bottom of the shaft is recessed to provide a shoulder 81 which rests on top of a collar 82. The bottom of the collar 82 has an outer flange 83 which is secured to a horizontal rectangular shoe 84. The shoe rests on a horizontal frame member 85. The bottom of the shaft 80 projects through the collar 82 and also through the shoe 84. The shaft is threaded at its lower end for engagement with a securing nut 86. The shoe 84 is slidably held between parallel guide rails 87 at the sides and retaining strips 88 projecting from the guide rails over recessed edges 89 of the shoe. Radial adjustment of shaft 80 on the horizontal frame member 85 is effected by adjusting the position of the shoe 84 by means of a threaded rod 90, one end of which is secured to the shoe 84 and the other end to adjusting nuts 91 and 92 on either side of a lug 93 projecting upwardly from the horizontal frame member 85.

The upper end of the shaft 80 is held in a collar bearing which is also radially adjustable parallel to the adjustment of the lower bearing by means of a platen 95 with which it is integral and which is slidably carried on a shelf 96 secured to the upper frame member 97 of the unit by means of slotted apertures 98 in the platen engaging bolts 99 passing through apertures of the shelf.

Two horizontal wheels 101 and 102, preferably spoke wheels, in order to permit the free circulation of air therethrough and thereby prevent the building up of localized heat pockets, are rotatably mounted on the shaft 80, one above the other. The lower wheel 102 carries a thrust bearing 103 which rests on a ring 104 on top of an adjusting nut 105 threadedly carried by the collar 82. An anti-friction bearing 106 is disposed between the shaft 80 and the upper wheel 101 and is held by a retaining ring 106a.

The wheels are connected together by means of vertical tie bars 107 and they are rotated together relative to the shaft 80 by means of a ring gear 108 secured to the lower wheel 102 which meshes with a pinion 109 secured to the top of a vertical shaft 110. The shaft 110 is rotatably journaled in a bearing 111 attached to a bracket 112 of the shoe 84. To the bottom of the shaft 110 there is secured a bevel gear 113 which meshes with another bevel gear 114 on a horizontal shaft 115 journaled in a pair of spaced bearings 116 and 117 on the shoe 84. Between the bearings 116 and 117 sprockets 118 are secured to the shaft 115 and they are driven by sprocket chains 119 meshing with sprockets 120 on the drive shaft 68 which is disposed beneath the frame member 85. The sprockets 120 are mounted on the shaft 68 and are connected to it by means of a key 121 in a keyway 122 so as to permit self alignment of the sprockets 118 and 120 when the shoe 84 is moved in different positions of adjustment.

The lower wheel 102 carries at its periphery a plurality of circumferentially spaced horizontal brackets 123 projecting outwardly from the edge of the wheel. To the bottom of each of said brackets 123, there is adjustably mounted a hollow conical member 124 constituting the mold within which the baked wafers are formed into cones. The mold 124 is provided with an attaching flange 125 near the top which has circumferential slots 126. The top of the mold 124 projects upwardly through an aperture 127 in the bracket 123 and at the top of the flange 125 bears against the bottom of said bracket 123. The said bracket has circular apertures 128 positioned to correspond with the slots 126. Bolts 129 in said apertures 128 pass through the slots 126 and are provided with holding nuts 130. By these means, the position of the molds 124 on their respective brackets 123 may be adjusted by loosening the nuts 130, rotating the mold relative to the bracket within the limits provided by the length of the slots, and retightening the nuts 130.

The molds are each provided with a longitudinal slot opening 131 to permit entrance therein of the wafer to be formed. The slot extends from the apex of the cone to the top, the apex itself having a blow-out hole 132 for cleaning purposes.

Figure 2:
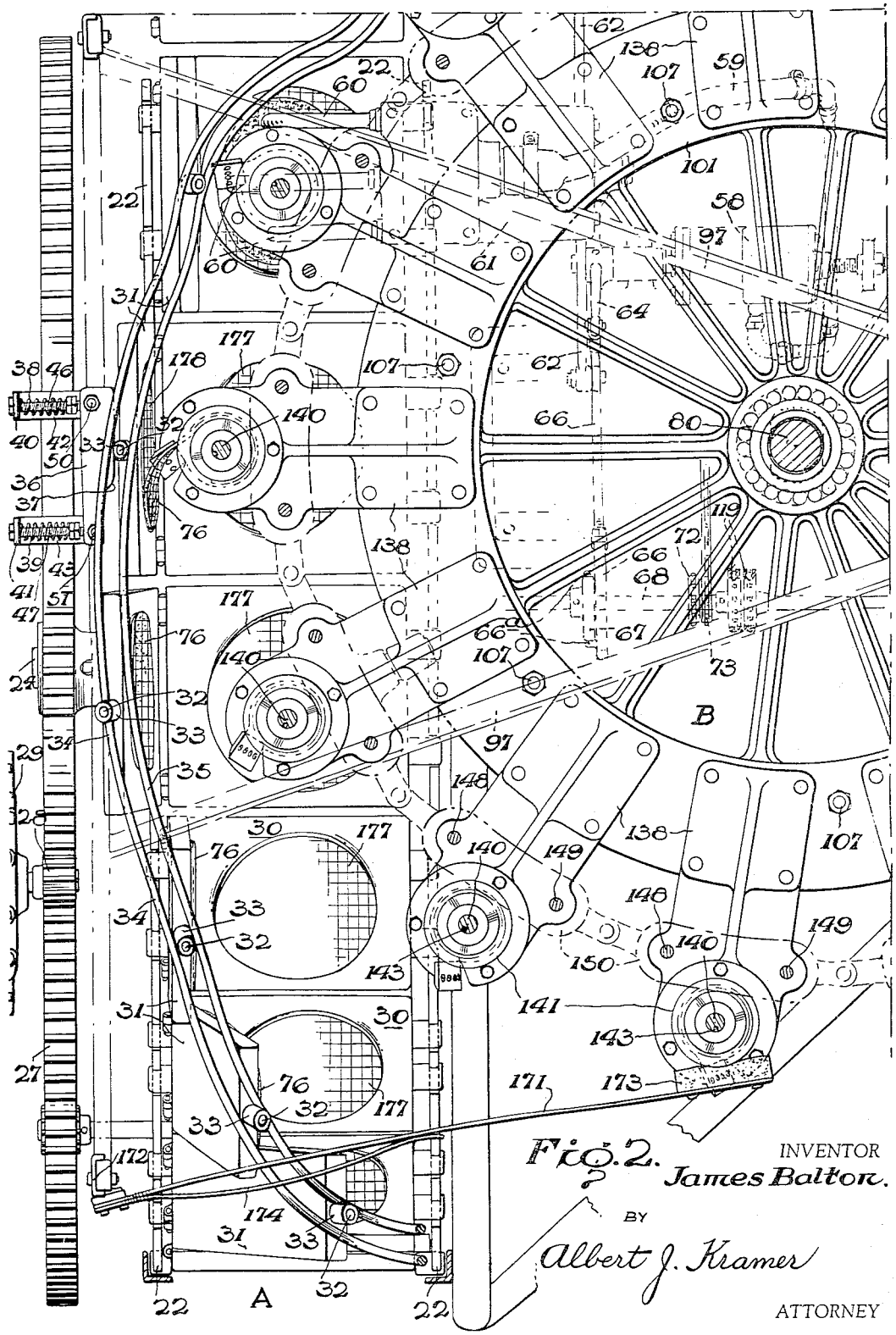
Fig. 2 is a plan view, partly in section, of a portion of the embodiment.

The shaft 80 and wheels 101 and 102 are rotated counterclockwise, as viewed in Fig. 2. In this relation, the aft side of the slot opening 131 is provided with a nearly tangential extension 133, the outer edge 134 of which is recessed or rabbeted to receive a removable scaper blade 135 that lies flush with the inner surface of the extension 133. The blade 135 is secured in position by means of countersunk bolts 136 and the outer edge 137 of the blade is beveled on the back side, substantially as shown. The function of this blade is to scoop the leading edge of the wafer into the slot opening 131 from whence it is guided to the interior of the mold and shaped.

The upper wheel 101 is also provided with a plurality of circumferentially spaced brackets 138, each in the same radial plane as one of the brackets 123 on the lower wheel. Each bracket 138 has a vertical yoke 139 which carries a vertically reciprocating rod 140. Between the arms of the yoke 139, a roller 141 is disposed and through which the rod 140 also passes. The roller 141 is mounted on the rod 140 for rotation therewith, but axially slidable relative thereto, by means of a key 142 secured to the roller slidably engaged with a longitudinal keyway 143 on the face of the shaft, whereby the rod may be reciprocated vertically relative to the yoke 139 and roller 141 and also rotated by turning of the said roller.

The upper end of the rod 140 is journalled in a bearing 144 in the center of a cross arm 145. The outer ends of said cross arm have vertical sleeves 146 and 147 which are slidably engaged with vertical guide rods 148 and 149, respectively. The lower ends of said rods 148 and 149 pass through the upper wheel bracket 138 and are secured to the lower wheel bracket 123, thereby serving to resist torsional misalignment between said upper and lower brackets. The upper ends of the guide rods are held in apertures at the upper ends of a vertically elongated bracket 150 which is secured to the bracket 138 of the upper wheel. The upper ends of the elongated brackets 150 are linked together by means of overlapping lugs 151 connected by bolts 152.

The inner side of the bracket 150 is porvided with an elongated vertical slot 153 through which a horizontal finger 154, integral with the cross arm 145, extends radially inward and is provided with a cam roller 155. Said cam roller moves along a camway composed of a pair of straddling parallel rails 156 and 157 which extends around approximately one-half of the inside of the cage formed by the brackets 150 and contain curvatures to force vertical movement of the cam rollers 155 in accordance with the requirements, as will be explained more fully hereinafter. The camway rails are supported in fixed position by means of radial arms 158 secured to a hub 159 of the stationary shaft 80.

To the lower end of the reciprocating rod 140, there is secured a conical core or spinner 160 having lateral projections 161. The core 160 is adapted to move in and out of the mold 124 by virtue of the reciprocation of the rod 140 and also to be rotated at definite intervals by means engaging the rollers 141. The lower limit of travel of the core 160 relative to the mold 131 is adjustable by means of a vertically adjustable abutment screw 162 on the cross arm 145, the lower end of which is adapted to engage the yoke 139. The core 160 is threadedly secured on the end of the rod 140. The proper lower position of the core should be such as to allow a clearance between it and the inside surface of the conical mold 124 sufficient to permit the wrapping of the wafer around the core as it enters the mold through the slot 131. The exact position will depend upon the thickness of the wafer.

Rotation of the core is effected at two points in the orbit of its revolution on the turret. The forming unit B is set relative to the baking unit so that the scraper blade 135 of one of the molds engages a cover grill when the grill passes across the yieldable abutment cam 36, as shown in Figs. 2 and 3. At this instant, the core 160, which is at its lowermost position in the corresponding mold, is given a rapid rotation clockwise, as viewed in Fig. 2, so that as the wafer is picked up by the blade 135 and directed into the mold, it is engaged by the surface projections 161 of the core, pulled in, and spun around in the space between the core and the mold, thereby forming the cone. Rotation of the core at this point is effected by a driven endless belt or belts 163 carried over pulleys 164, 165 and 166 on stationary frame members or supports 167. The inner reach of the belt, between the pulleys 164 and 166 is in the path of travel or orbit of the rollers 141. The belt is driven by a powered shaft 167 which has a pulley 168 connected by a belt 169 to a pulley 170, the latter being secured to the same shaft as one of the other pulleys, say the pulley 165.

When the rollers 141 leave the belts 163, they stop rotating. Beyond this point the cam rollers 155 enter the camway to elevate the cores 160 which will carry with them the formed cones, provided that the cones in the course of cooling somewhat, do not adhere to the inner surface of the conical mold. To break this surface adhesion the cones are rotated again slightly in the molds just as they are about to be elevated. This rotation is accomplished by means of a horizontal arm 171 secured at one end to a suitable frame member 172. The outer end of said arm 171 carries a pad 173 of rubber or of other suitable friction material in the orbit of the rollers 141 and which engages the said rollers, thereby imparting to them a slight rotation. A leaf spring 174 may be added to increase the pressure of the pad against the rollers.

As the cones are elevated in passing beyond this point, the upper rim of the formed cones engage a pair of stripping fingers 175 that are secured to the bottom of the yokes 139 and force a separation of the cones from the cores. The freed cones then fall under the influence of gravity onto a sloping discharge chute 176.

The embodiment described is fully automatic and requires no human effort whatsoever. The batter is fed automatically to the waffle irons in the open position, the cover grills are automatically closed and the wafers baked as they pass through the oven. Upon leaving the oven, the cover grills are automatically opened by the rollers 33 operating in the guideway formed by the tracks 34 and 35, the wafers being carried by the cover grills. This is made possible by the use of intaglio or recessed lines 177 and 178 on the surfaces of the base and cover grills, respectively, of different spacings and of different depths thereby effecting a more positive holding effect or adhesion at the surface of the cover grill than at the surface of the base grill.

When the cover grill is in its fully opened position with its cam roller 33 engaging the yieldable abutment 36, the scraper blade 135 of one of the molds 124 contacts the face of a cover grill, scoops the leading edge of the hot baked wafer into the mold at which point the core is rapidly rotated. The wafer at this temperature is pliable, is drawn into the mold and formed into a cone in the space between the rotating core and the inner wall of the mold. As it passes around to the front of the machine, the formed cone cools sufficiently to develop enough rigidity to permit it to be stripped from the core and dropped into the discharge chute 176 as explained above.

Having thus described my invention, I claim:

1. A cone rolling unit comprising a rotatable turret, a plurality of conical molds spaced about the periphery of said turret, a plurality of corresponding conical cores spaced about the periphery of said turret above said molds, a shaft axially secured to each of said cores, a roller slidably keyed to each of said shafts, means for reciprocating each core and shaft relative to its corresponding roller and mold, an endless belt adjacent one side of the turret having a portion thereof at a fixed position in the orbit of revolution of said rollers on the turret, means for driving said belt, and a stationary arm having a friction area at another fixed position in the orbit of revolution of said rollers.

2. A device for rolling baked wafers into cones, comprising a stationary post fixed against rotation, a turret member mounted for rotation about said post, said turret member having an uppermost and a lowermost horizontal wheel, said wheels being rigidly connected together, a plurality of cone forming molds secured and spaced about the periphery of the lowermost wheel, a corresponding plurality of conical core members disposed above said molds, each in vertical alignment with one of the molds, a vertical reciprocating shaft for each core member having its lower end connected to its corresponding core member, a pair of vertical guide rods for each shaft, said guide rods extending upwardly from the uppermost wheel, a vertically elongated bracket carried by the uppermost wheel for holding each pair of guide rods in the vertical position, a member attached to the upper end of each shaft and slidably engaging both of said guide rods, means connecting the upper ends of the brackets to each other, a vertical roller carried by the bracket, said roller being slidably keyed to the shaft, said bracket having a vertical slot, a horizontal finger connected to the shaft and extending through said slot, and a camway carried by the stationary post for engaging said finger and moving the shaft vertically during rotation of the turret about the post.

3. A device as defined by claim 2 in which the wheels are perforated to increase ventilation thereof and dissipation of heat.

4. A device as defined by claim 2 in which the camway is connected to arms secured to and projecting radially from the stationary post.

References Cited in the file of this patent

UNITED STATES PATENTS

| | | |
|---|---|---|
| 1,350,859 | Drouillard | Aug. 24, 1920 |
| 1,377,304 | Borchard | May 10, 1921 |
| 1,552,854 | James | Sept. 8, 1925 |
| 1,576,011 | Tatosian | Mar. 9, 1926 |
| 1,720,304 | Taylor | July 9, 1929 |
| 2,628,576 | Finke | Feb. 17, 1953 |